United States Patent [19]
Brandriff et al.

[11] Patent Number: 6,102,168
[45] Date of Patent: Aug. 15, 2000

[54] BRAKE SYSTEM FOR WHEELED SKATES

[76] Inventors: Robert C. Brandriff, 110 Creamery Brook Rd., Brooklyn, Conn. 06234; George Edward Avila, 21 Buck Hill Rd., Canterbury, Conn. 06331

[21] Appl. No.: 09/177,656

[22] Filed: Oct. 23, 1998

[51] Int. Cl.⁷ .............................. F16D 55/36; A63C 17/14
[52] U.S. Cl. ...................... 188/71.5; 280/11.2; 301/5.3; 301/6.1
[58] Field of Search .................. 188/71.5, 73.1; 280/11.2, 11.19, 841, 11.22, 11.23, 11.27; 301/5.3, 5.7, 6.1

[56] References Cited

U.S. PATENT DOCUMENTS

| | | | |
|---|---|---|---|
| 5,308,093 | 5/1994 | Walin | 280/11.2 |
| 5,351,974 | 10/1994 | Cech | 280/11.2 |
| 5,375,859 | 12/1994 | Peck et al. | 280/11.2 |
| 5,401,038 | 3/1995 | Peck et al. | 280/11.2 |
| 5,486,011 | 1/1996 | Nelson | 280/11.2 |
| 5,501,474 | 3/1996 | Conte | 280/11.2 |
| 5,511,803 | 4/1996 | Klukos | 280/11.2 |
| 5,582,418 | 12/1996 | Closser | 280/11.2 |
| 5,630,596 | 5/1997 | Rudolph | 280/11.2 |
| 5,630,597 | 5/1997 | Klukos | 280/11.2 |
| 5,752,707 | 5/1998 | Cottle et al. | 280/11.2 |
| 5,772,221 | 6/1998 | Daley | 280/11.2 |
| 5,791,663 | 8/1998 | Klukos | 280/11.2 |
| 5,803,468 | 9/1998 | Petrucci et al. | 280/11.1 |
| 5,908,197 | 6/1999 | Strothmann et al. | 280/11.2 |

*Primary Examiner*—Robert J Oberleitner
*Assistant Examiner*—Robert A. Siconolfi
*Attorney, Agent, or Firm*—Venable; Richard L. Aitken

[57] ABSTRACT

The present invention is a brake system for wheeled skates, and in particular in line skates. The brake system consists of at least one brake disk, but preferably two sets of interleaving disks. The first set of disks are keyed to a wheel's shaft, and the second set of disks are keyed to the inner hub of the wheel. The first set of disks cannot rotate around the shaft which is fixedly attached to the frame of the skate. The second set of disks rotate with the wheel. Both sets of disks are free to move axially. To brake, a skater shifts his weight onto the outside of his feet, which causes both the first set and second set of disks to move towards the inside of the skate and compress together. The frictional force between the rotating second set of disks and the nonrotating first set of disks causes the second set of disks to decrease in rotational speed. The slowing of the second set of disks which are keyed to the wheel causes the wheel to commensurately slow down and, if the pressure is maintained, come to a stop.

16 Claims, 4 Drawing Sheets

BRAKE SYSTEM FOR WHEELED SKATES

FIELD OF THE INVENTION

The present invention relates to brake systems for wheeled skates, and in particular, in line wheeled skates.

BACKGROUND OF THE INVENTION

In line skates have become very popular in the last ten years or so, almost completely replacing traditional roller skates as the preferred form of wheeled skates. These skates are enjoyed by a broad cross section of the population for general recreational use, and by specialized other groups for such activities as trick and acrobatic skating, and hockey and other athletic activities.

One problem encountered by virtually all users of in line skates is the lack of an effective brake system. While prior art brake systems exist for in line skates and roller skates, such systems tend to be simplistic and have major limitations. For example, the brake system typically provided on in line skates consists of a hard rubber pad attached to the back of the skate frame. Through the flexing of the skater's ankle, the pad is brought into contact with the ground and a crude braking is effectuated. While the more athletic and talented skaters seem to effectively brake in most circumstances by bringing the brake pad into contact with the ground, less experienced skaters may find the brake pad workable only at slow speeds.

Another method of braking involves dragging one skate, turned 90 degrees to the direction of travel, behind the skate bearing the skater's weight and pointed in the direction of travel. Disastrous falls can occur however when the skate being dragged is not properly positioned and the wheels roll the skate away from the desired path at an unexpected angle.

A further method of braking sometimes used is to skate in a zig-zag or slalom pattern, with a braking action occurring in each turn. Additionally, some after market systems have employed a cable with one end attached to a brake device on the skate, and the other end coupled to a hand-held actuator. Upon engaging the actuator the cable forces a brake pad to contact a skate wheel or the ground.

In light of the shortcomings of prior art brake systems for in line skates, it is an object of the present invention to provide an improved, more reliable and safer brake system for in line skates.

SUMMARY OF THE INVENTION

The novel brake system of the present invention allows a skater to implement a controlled braking action through a slight variation of the normal skating motion. The brake system comprises at least one disk, but preferably a series of disks, which are assembled between the wheel bearings in the hub of at least one wheel per skate. Approximately half of the disks are keyed to and rotatable with the wheel hub or a sleeve inserted into the wheel hub. The remaining disks are interleaved with these rotating disks and positioned around an inner hub which slides over a shaft. The shaft, the inner hub, and the disks positioned around the inner hub cannot rotate. Both the rotating disks which are keyed to the wheel hub, and the nonrotating disks which are slidably coupled to the inner hub, can move axially to a slight degree. The rotating disks can move axially through the key slot in the wheel hub and the nonrotating disks can move axially along the inner hub.

During a normal skating motion, a skater pushes his or her skates out and back at approximately a 45 degree angle. This pushing off places a force on the inner portion of the skate wheels, and consequently forces the wheels and braking disks to slide axially towards the outside of the skate. While there may be some contact among the disks during this skating motion, the disks do not compress against one another, and a braking action is therefore not produced. Similarly, when the skater is coasting with the wheels of each skate pointed in the direction of travel, the brake disks will move back and forth axially to some degree depending on the vagaries of the skating surface and the positioning of the skater's feet and ankles. However, once again, the brake disks do not compress against one another and a braking action does not occur.

To achieve a braking action utilizing the present invention, a skater bows out his ankles by rolling onto the outside portion of his feet. This causes force to be transferred from the bottom or inside portion of the wheels to the outside portion of the wheels, and consequently causes the wheels and brake disks to move axially towards the inside portion of the skate. Since the skater maintains his feet in this position throughout the braking process, the brake disks not only travel axially towards the inside portion of the skate, but the disks compress together and remain compressed together. The compression of the brake disks causes the rotating disks attached to the wheel hub to lose speed because of the frictional drag imparted on the rotating disks by contacting the nonrotating disks. As the rotating disks lose speed, the hub and wheel commensurately lose speed, and the wheels of the skate eventually come to a stop.

DETAILED DESCRIPTION OF THE PREFERRED EMBODIMENTS

Figure 1:
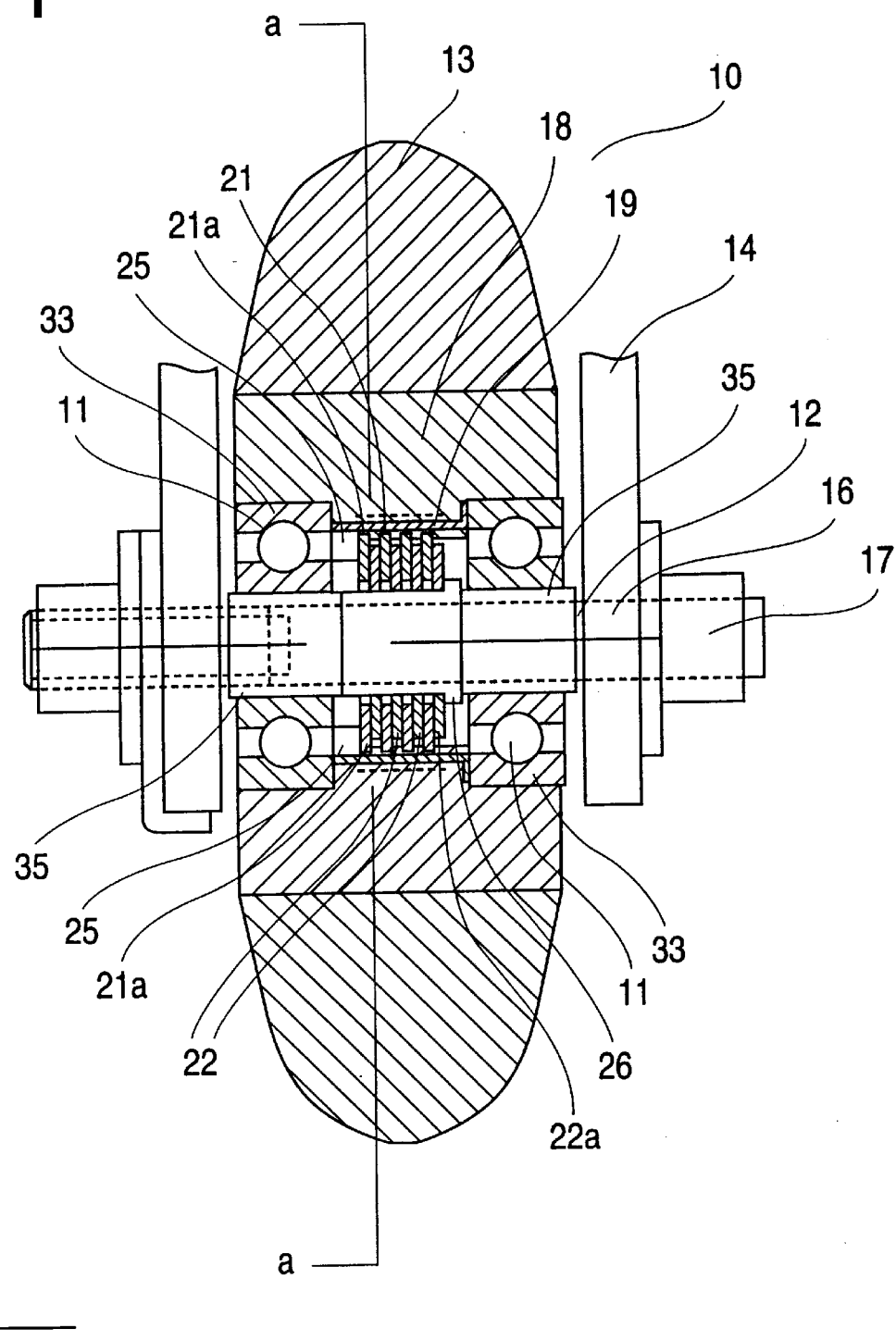
FIG. 1 is a partial sectional view of the brake system of the present invention.
Figure 5:
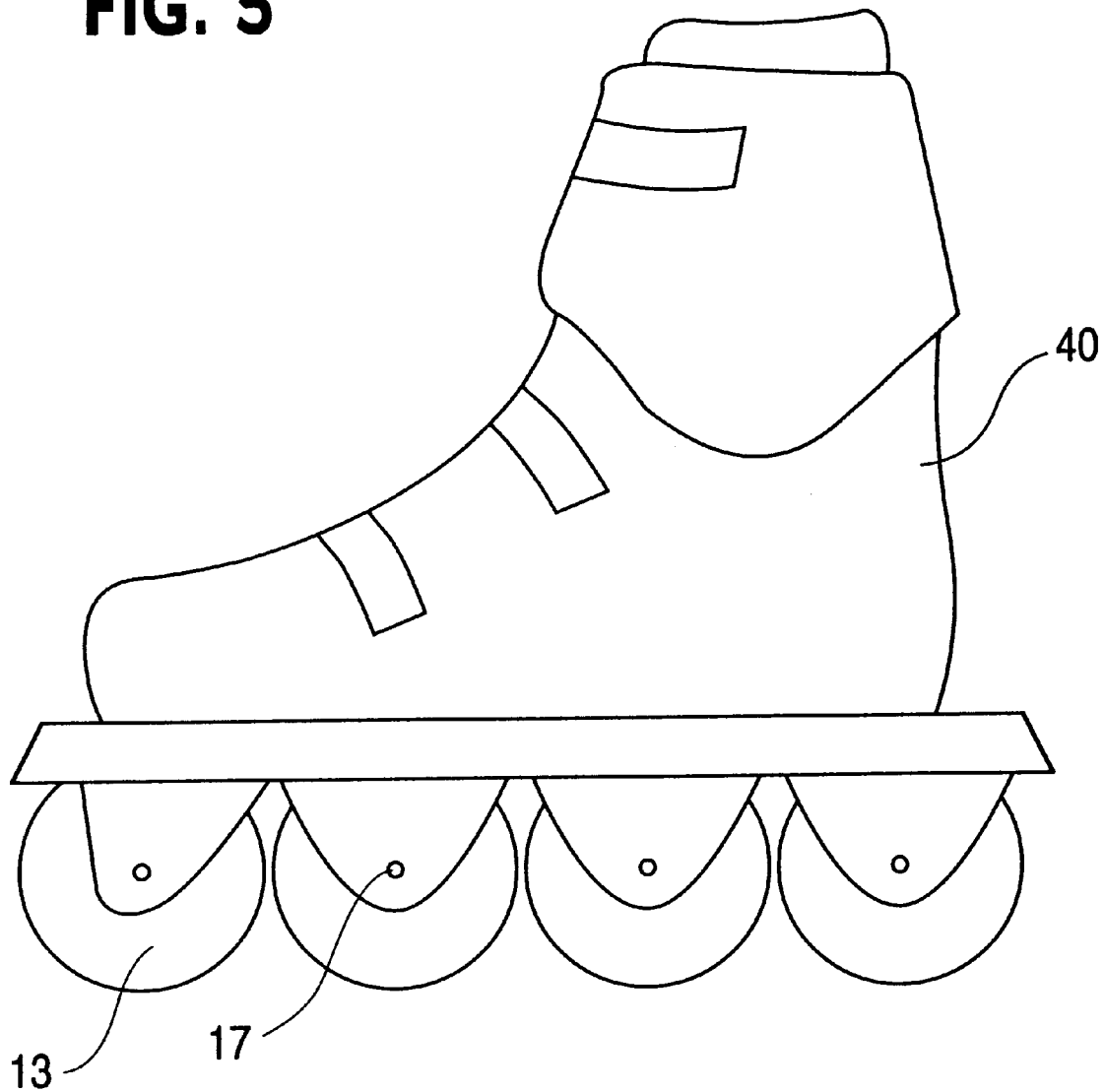
FIG. 5 is a perspective view of an in line skate of the type in which the brake system of the present invention is incorporated.

As illustrated in FIG. 1, a wheel system of an in line skate consists of a shaft 12, a wheel 13, bearings 11, bearing seats 33, and a skate frame 14. FIG. 5 shows such a wheel system on an in line skate 40. The wheel itself contains a hub 18 and a hub sleeve 19. The bearings 11 rotatably mount the wheel 13 on shaft 12. The hub sleeve 19 may be integral with the hub 18, or it may be a separate sleeve which slides into the hub 18. The system may also have an inner hub 35 concentrically coupled to shaft 12. The wheel 13 is attached to the skate frame 14 by placing the shaft 12 through an opening of the wheel hub 18, placing shaft 12 into receiving slots 16 of the frame 14, and fixedly attaching the shaft 12 to the frame 14 via fastener 17. The foregoing is the basic wheel system of an in line skate.

Figure 2:
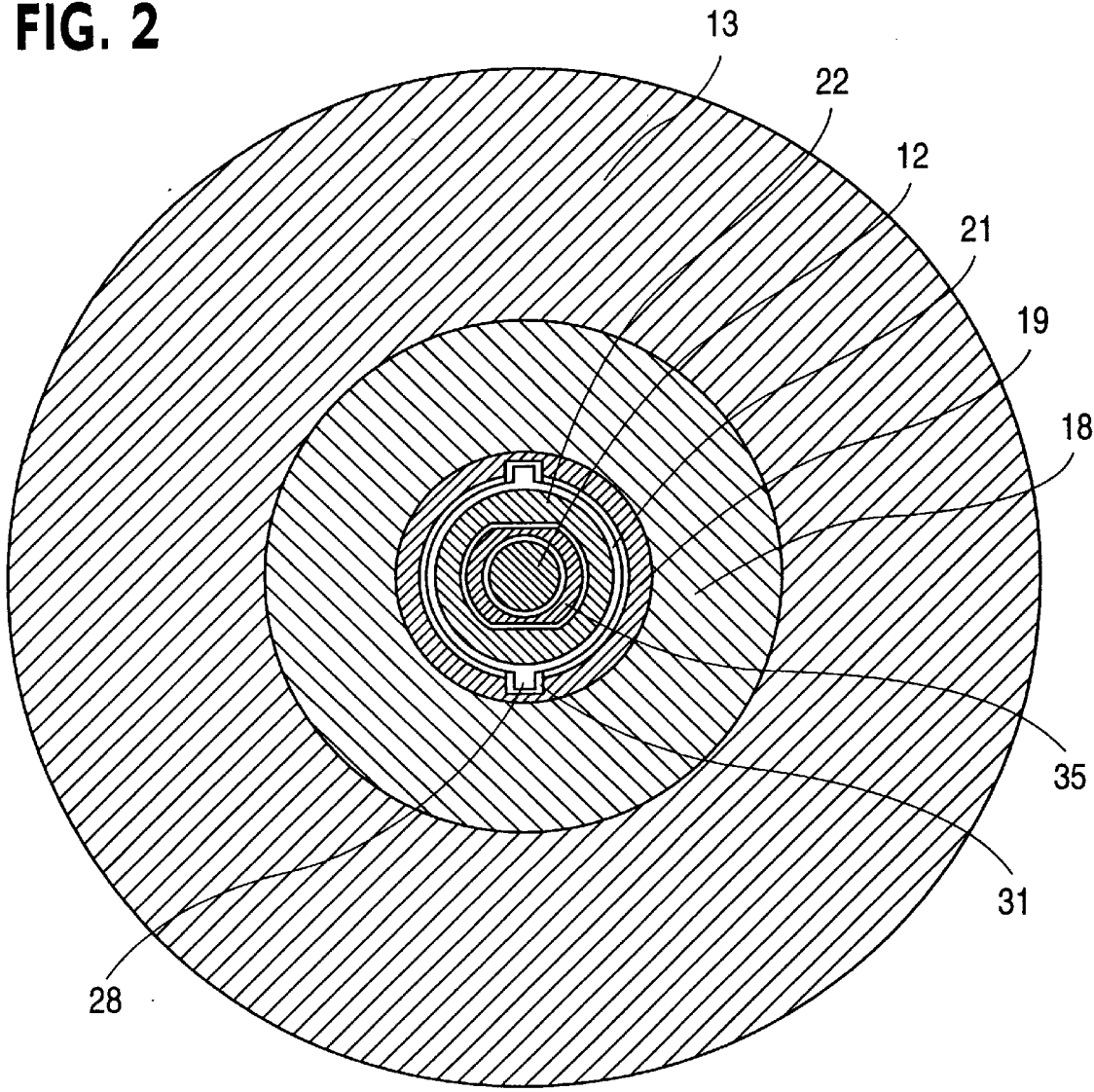
FIG. 2 is a cross section of the brake system of the present invention taken along line a—a of FIG. 1.
Figure 3:
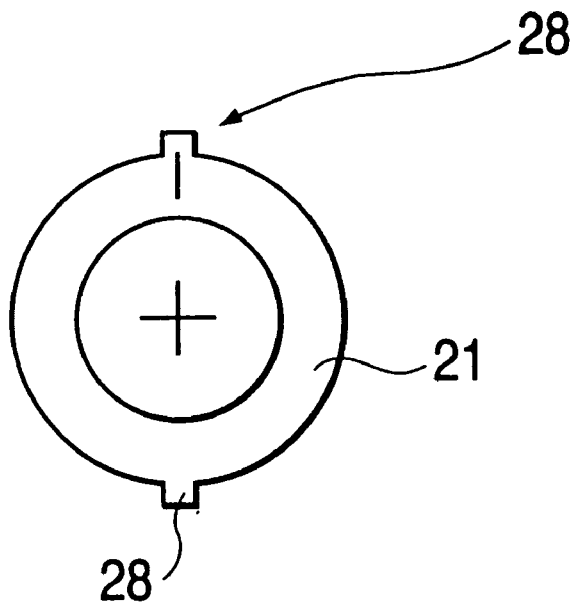
FIG. 3 is a side view of a brake disk of the present invention which rotates with the wheel of the skate.
Figure 4:
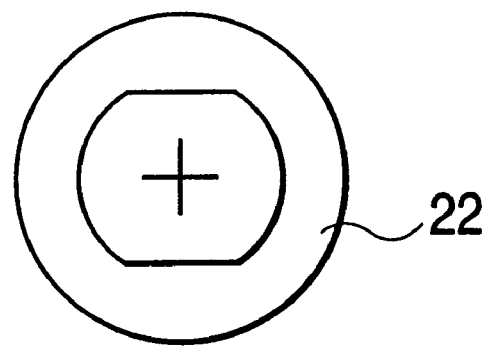
FIG. 4 is a side view of a brake disk of the present invention which does not rotate with the wheel of the skate.

The brake system of the present invention is identified by the number 10 in FIG. 1, and can be incorporated into the wheel system of an in line skate. Alternatively, the brake system of the present invention could be incorporated into a traditional four-wheeled roller skate. The brake system 10 preferably comprises two sets of disks 21 and 22. Disk 21 is illustrated in FIG. 3 and disk 22 is illustrated in FIG. 4. A first set of disks 21 is keyed to hub sleeve 19 via retaining tabs 28 on each disk 21. The keying of disks 21 to hub sleeve 19 causes the disks 21 to rotate with the wheel 13. Tabs 28 are slidably coupled to wheel 13 through key slots 31 as illustrated in FIG. 2, which is a sectional view taken along line a—a of FIG. 1. The outermost disk 21a is bounded by wheel hub sleeve shoulder 25. The disks 21, while they are keyed to the hub sleeve 19 and rotate therewith, also can move axially in slots 31 during skating. Such movement is critical to the brake system 10 of the present invention as will be explained infra.

A second set of brake disks 22 are slidably coupled to inner hub 35, which as stated supra concentrically surrounds shaft 12. As shown in FIG. 4, openings in centers of the annular disks 22 are slots in the shape of a double D, and as illustrated in FIG. 2, the cross section of the middle of the shaft 12 shows that it is also double D-shaped to fit through the double D-shaped openings in the disks 22. Because of this non-circular coupling and the fixed attachment of shaft 12 to skate frame 14, disks 22 cannot rotate with the wheel 13 as do the disks 21. However, the disks 22, like disks 21, can move axially along inner hub 35. The innermost disk 22a is bounded by the inner hub shoulder 26. The axial movement of disks 22 is limited by inner hub shoulder 26. Like the axial movement of disks 21 through slot 31, the axial movement of disks 22 along inner hub 35 plays a vital role in the brake system 10.

The brake system 10 functions as follows. When a skater is moving in the normal forward direction, he is either coasting by placing his feet parallel to the direction of travel, or he is actively skating by alternatively pushing out and back using the inside portion of the wheels 13. During coasting, there is sufficient play in the wheels 13 and disks 21 and 22 so that disks 21 freely rotate with wheel 13 and no braking action occurs. During the active skating motion, the skater pushes off and out on the inside portion of wheels 13. This causes the entire wheel assembly, i.e. the wheel 13, bearing seats 33, wheel hub 19, wheel hub sleeve shoulder 25 and disks 21 and 22 to move axially towards the outside of the skate, as designated by arrow A in FIG. 1. This axial motion is permitted by a sliding fit between the bearing seats 33 and the inner hub 35. The axial movement of wheel hub sleeve shoulder 25 increases the axial space between it and inner hub shoulder 26, thereby allowing the uninhibited rotation of disks 21. Consequently, coasting and a normal skating motion disengage the brakes.

To brake, the skater must transfer his weight in such a manner so that his weight is put on the outside portion of the wheels 13. The skater preferably does this by first pointing his skates parallel to the direction of travel, and then bending his ankles outward so that his weight "rolls onto" the outside portion of his skates. Alternatively, a skater can engage the brake system 10 by pointing his toes slightly inward in a snow plow position. The transfer of the skater's weight to the outside portion of the wheels 13 causes the entire wheel assembly, i.e. the wheel 13, bearing seats 33, wheel hub 19, wheel hub sleeve shoulder 25, and disks 21 and 22 to move axially towards the inner hub shoulder 26 which is stationary. The axial movement of wheel hub sleeve shoulder 25 towards the inner hub shoulder 26 narrows the gap between wheel hub sleeve shoulder 25 and inner hub shoulder 26, and compresses disks 21 and 22 up against inner hub shoulder 26. The disks 21 and 22 remain in this compressed position as long as the skater maintains his weight on the outside portion of the skates. When the disks 21 and 22 are compressed in this manner, the rotational speed of disks 21 decreases because of the frictional drag between the disks 21 and the nonrotating disks 22. The decrease in rotational speed of disks 21 causes a commensurate loss of rotational speed of the wheels 13 since disks 21 and wheel 13 are connected via tabs 28 and key slots 31. If the skater maintains the outside pressure on the wheels 13, the disks 21 eventually cease rotating, thereby stopping wheel 13 from rotating, thereby stopping the skater.

For efficient braking, the brake system 10 should be installed on at least two wheels of a skate. Most in line skates have four wheels per skate, and placing the brake system 10 on the middle two wheels is recommended. Furthermore, the selection of suitable materials for the disks, and/or the positioning of materials of a higher/lower friction coefficient between the two sets of disks, allows the range and magnitude of braking force to be controlled. The inventors have discovered that manufacturing the disks out of readily available spring hardened steel results in effective braking.

While the preferred embodiment of the invention has been described as employing a plurality of disks 21 keyed to the hub sleeve 19 to rotate with the wheel 13 and a plurality of disks 22 slidably coupled to shaft 19, it will be appreciated that the braking could be achieved with only one disk 21 and one disk 22. Other mechanisms could also be used to brake the wheel in response to the narrowing of the axial space between the shoulders 25 and 26.

It will further be appreciated by those skilled in the art and it is contemplated that variations to the embodiments illustrated and described herein may be made without departing from the spirit and scope of the present invention. Accordingly, it is intended that the foregoing description is illustrative only, and the true spirit and scope of the invention will be determined by the appended claims.

What is claimed is:

1. A brake system for wheeled skates comprising:
    a shaft fixedly attached to a skate frame, said shaft having a first shoulder thereon;
    a wheel rotatably mounted on said shaft, said wheel having a part with a second shoulder thereon to define a space extending axially between said shoulders; and
    a braking mechanism responsive to the narrowing of said space to brake said wheel;
    said wheel being axially movable on said shaft between a first position in which said space is relatively narrow and said braking mechanism is engaged and a second position in which said space is relatively wide and said braking mechanism is disengaged.

2. The brake system for wheeled skates according to claim 1, wherein said brake mechanism comprises a plurality of brake disks mounted in said space to be axially slidable in said space.

3. The brake system for wheeled skates according to claim 2, wherein at least one of said disks is coupled to rotate with said wheel and at least one of said disks is coupled to said shaft so that it cannot rotate with said wheel.

4. The brake system for wheeled skates according to claim 3, wherein a plurality of a first set of disks are coupled to rotate with said wheel, and a plurality of a second set of disks are coupled to said shaft so as not to rotate with said wheel and are interleaved with said first set of disks.

5. The brake system for wheeled skates according to claim 1, wherein said part comprises a separable and removable hub sleeve insertable into said wheel.

6. The brake system for wheeled skates according to claim 2,
    wherein said space between said shoulders is narrowed by the transfer of a skater's weight to the outside of the skater's feet;

wherein such narrowing causes said first shoulder to compress said brake disks together and towards said second shoulder; and wherein the compression of said brake disks causes said wheel to decrease in rotational speed.

7. The brake system for wheeled skates according to claim 2, wherein said brake disks are manufactured out of spring hardened steel.

8. A method for braking wheeled skates, said skates comprising:

a shaft fixedly attached to said skate frame;

an inner hub concentrically coupled to said shaft, said inner hub having a shoulder thereon;

a wheel mounted on said shaft, said wheel comprising a wheel hub having a shoulder thereon;

a first set of brake disks slidably coupled to said shaft;

a second set of brake disks keyed to said wheel hub and rotatable with said wheel, said second set of brake disks interleaved between said first set of brake disks;

said method comprising transferring a skater's weight onto the outer portion of the skater's feet, thereby placing the skater's weight onto the outer portion of said wheel, and further causing said first set of disks and said second set of disks to compress between said shoulder of said inner hub and said shoulder of said wheel hub, thereby slowing the rotation of said second set of disks and slowing the rotation of said wheel.

9. In a wheeled skate having a frame and wheels rotatably mounted on said frame, the improvement comprising a space extending axially between a surface coupled to said frame and a surface coupled to said one of said wheels, and a braking mechanism responsive to the narrowing of said space to brake said one of said wheels;

said wheel being axially movable on said shaft between a first position in which said space is relatively narrow and said braking mechanism is engaged and a second position in which said space is relatively wide and said braking mechanism is disengaged.

10. The wheeled skate according to claim 9, wherein said braking mechanism is mounted in said space.

11. The wheeled skate according to claim 10, wherein said braking mechanism comprises a plurality of brake disks mounted in said space.

12. The wheeled skate according to claim 9, wherein said space is within said one of said wheels.

13. The wheeled skate according to claim 12, wherein said one of said wheels is rotatably mounted on a shaft fixed to said frame, and said braking mechanism comprises a plurality of brake disks in said space, at least one of said brake disks being coupled to said one of said wheels to rotate with said one of said wheels and at least one of said brake disks being coupled to said shaft so as not to rotate with said one of said wheels.

14. The wheeled skate according to claim 13, wherein said disks comprise a first set of brake disks coupled to said one of said wheels to rotate with said one of said wheels and a second set of brake disks coupled to said shaft so as not to rotate with one of said wheels.

15. A wheeled skate comprising a frame, a plurality of wheels rotatably mounted on said frame, said wheels defining a direction axis for said skates to roll on a surface, and a braking mechanism responsive to the transfer of the skater's weight to the side of said skate displaced perpendicularly from said axis to brake one of said wheels.

16. A wheeled skate as recited in claim 15, wherein said wheels are mounted on said skate permit limited relative axial movement between said one of said wheels and said frame, said braking mechanism being responsive to the axial movement of said wheel relative to said frame to brake one of said wheels.

* * * * *